United States Patent
Ceotto et al.

(10) Patent No.: US 9,578,986 B2
(45) Date of Patent: Feb. 28, 2017

(54) AUTOMATIC COFFEE MAKER FOR PREPARATION OF ESPRESSO COFFEE

(71) Applicant: CMA Macchine Per Caffe' S.R.L., Susegana (Treviso) (IT)

(72) Inventors: Beppino Ceotto, Silea (IT); Giovanni Rossetto, Conegliano (IT)

(73) Assignee: CMA Macchine Per Caffe' S.R.L., Susegana (Treviso) (IT)

( * ) Notice: Subject to any disclaimer, the term of this patent is extended or adjusted under 35 U.S.C. 154(b) by 0 days.

(21) Appl. No.: 14/426,486

(22) PCT Filed: Sep. 6, 2013

(86) PCT No.: PCT/EP2013/068455
§ 371 (c)(1),
(2) Date: Mar. 6, 2015

(87) PCT Pub. No.: WO2014/037495
PCT Pub. Date: Mar. 13, 2014

(65) Prior Publication Data
US 2015/0250354 A1    Sep. 10, 2015

(30) Foreign Application Priority Data

Sep. 7, 2012    (IT) .............................. PN2012A0050

(51) Int. Cl.
  *A47J 31/047*    (2006.01)
  *A47J 31/56*    (2006.01)
  (Continued)

(52) U.S. Cl.
  CPC ............... *A47J 31/56* (2013.01); *A47J 31/36* (2013.01); *A47J 31/42* (2013.01); *A47J 31/465* (2013.01)

(58) Field of Classification Search
  CPC   A47J 31/42; A47J 31/56; A47J 31/465; A47J 31/36
  (Continued)

(56) References Cited

U.S. PATENT DOCUMENTS

| | | |
|---|---|---|
| 2007/0193452 A1 | 8/2007 | Campetella |
| 2010/0080886 A1 | 4/2010 | Hourizadeh |

(Continued)

FOREIGN PATENT DOCUMENTS

| | | |
|---|---|---|
| EP | 0608804 | 8/1994 |
| WO | WO0027262 | 5/2000 |
| WO | WO2010085850 | 8/2010 |

OTHER PUBLICATIONS

International Search Report and Written Opinion dated Oct. 7, 2013; International Application No. PCT/EP2013/068455; International Filing Date: Sep. 6, 2013; 10 pages.

(Continued)

*Primary Examiner* — Phuong Nguyen
(74) *Attorney, Agent, or Firm* — Blank Rome LLP

(57) ABSTRACT

Super-automatic coffee maker for the preparation of espresso coffee continuously and with the possibility of selecting the quantity and type of espresso coffee desired, thus obtaining an espresso coffee of high quality and flavor. Machine comprising a vertical piston (2) adapted to press the coffee, ground in a grinder, into collection and brewing means (3), applicable in a removable way in the lower part of the coffee maker, in an underlying position and coinciding with said piston (2), to determine the espresso coffee which is then supplied through said means. At the end of each brewing, said collection and brewing means (3) are removed and the used pod contained in them is then ejected, and they (Continued)

are cleaned manually, with subsequent application of said means in the lower part of the machine, to perform a subsequent operating cycle.

14 Claims, 8 Drawing Sheets

(51) Int. Cl.
    *A47J 31/42*     (2006.01)
    *A47J 31/36*     (2006.01)
    *A47J 31/46*     (2006.01)

(58) Field of Classification Search
    USPC ......... 99/281, 286, 280, 285, 323, 300, 288;
                                            426/595, 433, 594
    See application file for complete search history.

(56) References Cited

U.S. PATENT DOCUMENTS

2011/0212236 A1    9/2011    Nguyen et al.
2012/0121780 A1*   5/2012    Lai ..................... A47J 31/3623
                                                        426/433

OTHER PUBLICATIONS

English abstract; European Application No. EP0608804 dated Aug. 3, 1994; 1 page.

* cited by examiner

AUTOMATIC COFFEE MAKER FOR PREPARATION OF ESPRESSO COFFEE

RELATED APPLICATIONS

This application is a U.S. national phase application of International Application No. PCT/EP2013/068455, filed Sep. 6, 2013; which application claims priority to Italy Application No. PN 2012A 000050, filed Sep. 7, 2012. Each of the above-identified related applications are incorporated by reference.

FIELD OF USE

The invention relates to a super-automatic coffee maker for preparation of espresso coffee continuously and with the possibility of selecting the quantity and type of espresso coffee desired beforehand.

BACKGROUND OF THE INVENTION

The professional coffee makers currently used to prepare espresso coffee are the manual and super-automatic type and any type of coffee maker basically comprises a cupboard containing a water circulation circuit, supplied by mains water and attached at least to one heating boiler for the production of hot water and steam, wherein the water heating and steam temperatures are controlled by the thermostatic regulation at pre-set levels, said boiler being connected by means of circulation pumps and flow regulation valves, with a brewing unit, comprising a brewing chamber into which the ground coffee is first introduced, said unit communicating by means of an outlet pipe with an underlying collection container, so that the water heated in the boiler or in the exchanger to the pre-set and constant temperature is made to circulate by means of the circulation circuit and, passing through the dose of ground coffee, contained in the brewing chamber, obtains the espresso coffee, which is then supplied through the outlet pipe, reaching the underlying container.

The espresso coffee collected in the container may also be mixed with milk and possibly further heated with hot steam.

In these types of coffee maker, the coffee beans are ground beforehand in suitable grinders of the traditional type, which may be separated or incorporated into the coffee makers, so as to provide the ground coffee to introduce into the relative brewing unit of the coffee makers.

In particular, manual coffee makers are provided with at least one filter-holder element applicable in a removable way underneath the relative brewing unit of the machine and comprising a cup-shaped container provided with a filter and attached to an elongated support handle gripped by the operator, and the ground coffee is introduced manually into said cup-shaped container acting as the brewing chamber by the barman, in the desired quantity and before the brewing cycle, said ground coffee being pressed manually into the filtering cup before applying the filter-holder element underneath the brewing unit, and the brewing cycle is then started, wherein the heated water passes through the ground and pressed coffee and the filter meshes, thus obtaining the espresso coffee, which is supplied into the underlying container at optimum pressure for espresso.

Then, on completion of brewing, the filter-holder element is removed from the coffee maker and the used pod is ejected from the cup, by shaking or lightly striking the filter-holder element to detach the used pod, which is then discharged into special collection containers.

With these types of coffee makers it is therefore possible to obtain espresso coffee of high quality and flavour, grinding the coffee beans and pressing the ground coffee in the cup with suitable pressure and, if necessary, adjusting the pressure and the water temperature for the brewing step in an optimal manner based on experience, thus obtaining espresso coffee with highly satisfactory results.

The filter holder may be used immediately for a new brewing cycle, wherein a further dose of ground coffee is introduced into it for the preparation of another espresso coffee, and in this condition, as a result of heat conduction, the filter holder remains hot and allows a brewing cycle to be obtained in an optimal manner, with shorter heating time and therefore lower heating power.

These types of machines are particularly suitable for use in restaurants, bars and similar premises, since they prepare and supply high-quality espresso coffee at a high productivity rate, as a function of the requirements of individual users.

Unlike these manual coffee makers, the super-automatic coffee makers currently used are manufactured with several component parts realised and functioning in a slightly different manner, to allow continuous preparation of espresso coffee. In particular, in these super-automatic coffee makers, the grinder is always incorporated into the machines themselves and communicates with a vertical cylinder, housing a vertically sliding piston, controlled by an electric motor of the machine and movable from a lowered position to a raised position, and vice versa.

Said piston communicates with the hot water pipes fitted to the machine's boiler and act as presser and infuser, while the cylinder is provided with a collection cup of a dose of ground coffee. When the piston is moved into the high position, the collection cup is in the position communicating with the grinder outlet pipe and when the user selects a cup of coffee, the grinder is activated automatically and a dose of ground coffee is introduced into the collection cup. Subsequently, the piston is automatically and gradually lowered towards the cup containing the dose of ground coffee, so that, when the piston is in the completely lowered position, the dose of ground coffee is pressed against a corresponding striking block, with constant pressure which is independent of the quality of the espresso coffee to be obtained. Then, by means of the piston with the dose of coffee, the hot water is introduced through automatic opening of a solenoid valve inserted in the hot water pipes, with consequent passage of the hot water through the ground coffee and obtaining of a cup of espresso coffee, which is then supplied by means of a pipe to an underlying collection container. When brewing is completed, the hot water solenoid valve is automatically closed and the piston is once again moved into the high position, in which position an ejector cooperating with the cylinder cup is arranged, so that, in said position, said ejector acts against the used pod, ejecting it and discharging it into an associated collection container. The machine is thus prepared for a subsequent brewing cycle, which is performed with the same operating sequences.

In general, solutions exist in automatic machines wherein the movements of the piston and cylinder are inverted.

However, super-automatic espresso coffee makers thus realised do not allow an espresso coffee maker with the same quality features of manual machines to be obtained, both because the cylinder cup is the same for both single and double doses and because after ejection of each pod the cup is not cleaned precisely, with consequent mixing of the coffee residues of each cycle with the freshly ground coffee of a new dose, and obtaining of non-optimal brewing of this dose of coffee.

SUMMARY OF THE INVENTION

The object of the present invention is realising a coffee maker of a new type, so as to obtain continuous production of espresso coffee without the problems connected with the current super-automatic coffee makers, and with the same quality features as coffee obtained with the current manual espresso coffee makers.

The super-automatic coffee maker is realised with the construction features substantially described, with particular reference to the appended claims of this patent.

BRIEF DESCRIPTION OF THE DRAWINGS

The present invention will become more apparent from the following exemplary and non-limiting description and with reference to the attached drawings, wherein.

DETAILED DESCRIPTION OF THE ILLUSTRATED EMBODIMENTS

With reference to the mentioned figures, a super-automatic coffee maker, which corresponds with the invention, is shown, for preparation of espresso coffee continuously and with the possibility of selecting the quantity and type of espresso coffee desired beforehand.

Figure 1:
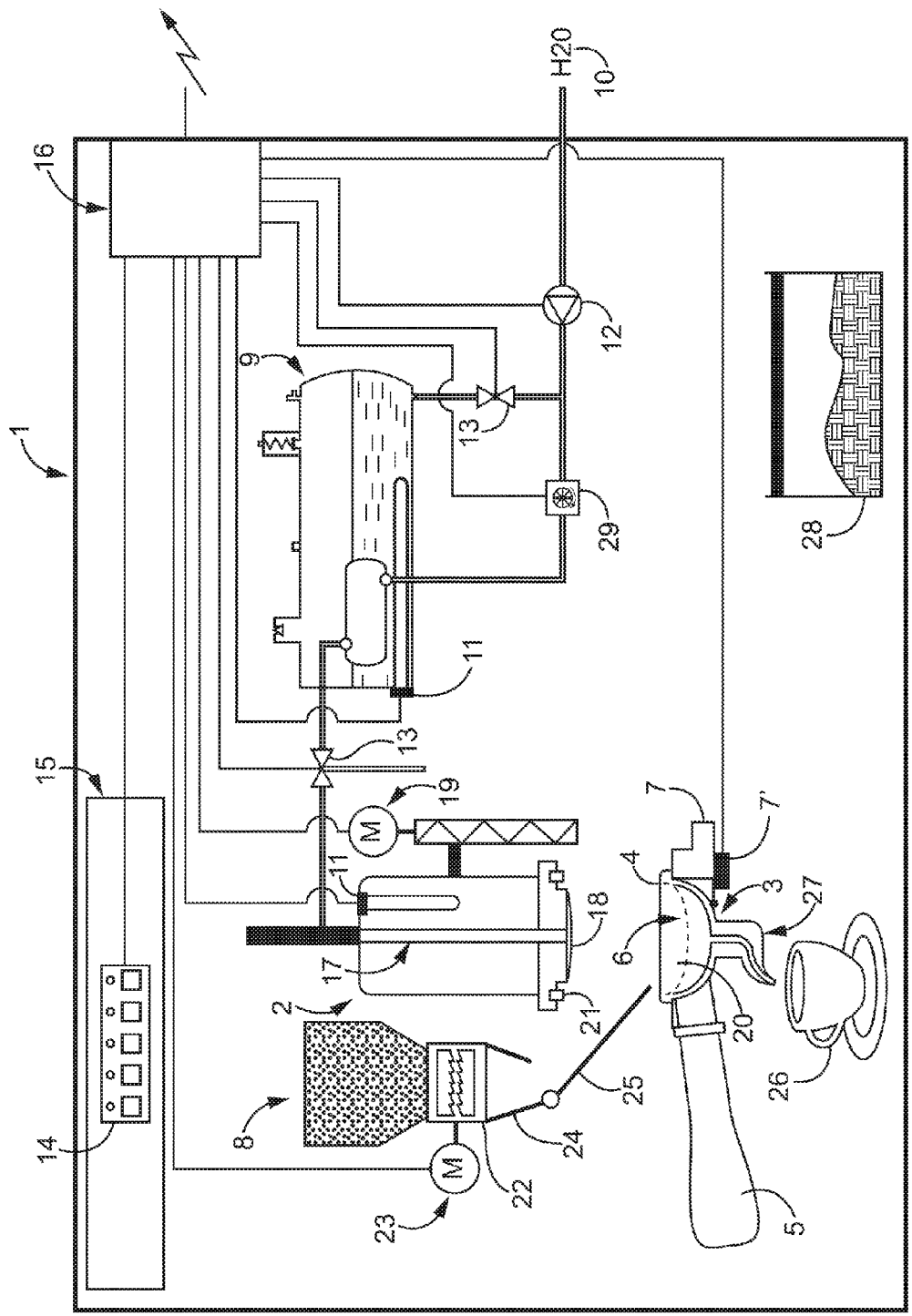
FIG. 1 shows a schematic view of various components of the present coffee maker.

In particular, in FIG. 1 the various components of the coffee maker considered are schematically illustrated, contained in a box-shaped cupboard 1 and comprising an elongated vertical piston 2, controllable in the manner and for the function which will be described from a raised position to a lowered position, and vice versa, and a filter-holder element 3, arranged in a fixed position at the vertical piston 2, and spaced from said piston in the vertical direction, said filter-holder element comprising a cup-shaped container 4 fixed and supported by an elongated handle 5 gripped by the operator, and provided with a perforated filter 6 designed to contain a dose of ground coffee, said filter-holding element being supported by a duly thermostatted attachment element 7, fixed to the machine, so that in the operating position of the filter-holder element 3, the cup-shaped container 4 is located in a position coinciding with the lower part of the vertical piston 2. The piston 2 may also be arranged in the machine in a horizontal or variously inclined position. Correct positioning of the filter-holder element 3 in the attachment element 7 is checked by a presence sensor 7'.

Further components of the machine comprise at least a container 8 of a grinder, into which the coffee beans to be ground are introduced beforehand, which are then ground as described, to obtain a single dose of coffee each time, at least a water heating boiler 9, which is fitted with an external water supply 10 and is provided with suitable thermostatted heating elements 11 for heating water and producing steam at pre-set heating temperatures, and also a circulation pump 12, flow control valves 13, and a series of buttons 14 for selection of the operating cycles, incorporated into a control panel 15 applied on the external front part of the machine, said buttons serving to switch on and switch off said various electrical components and to select the various operating cycles to be performed in the machine. The coffee maker also comprises an electronic control unit 16 of the traditional type, powered by the electricity network and connected operatively with the heating elements 11, the pump 12, the valves 13, which are preferably realised as solenoid valves, and also with the selection button 14, so that, depending on the operating cycles respectively selected by means of the buttons 14, said control unit 16 memorises the cycles and controls the electrical components of the machine to cause performance of said operating cycles.

Said piston 2 is provided internally with a central and vertical tube 17, for the entire height of said piston, said tube being provided with an upper end which extends upwards beyond the upper part of the piston 2, and which is coupled with the boiler 9 by means of a solenoid valve 13, which is controlled in closure and in opening by said electronic control unit 16. In turn, the lower end of the tube 17 is open and ends at the head 18, duly thermostatted, of the piston 2, so that by means of the tube 17, the hot water contained in the boiler 9 only circulates during the brewing cycle, when the solenoid valve 13 is controlled in opening and the circulation pump 12 is actuated and controlled by the electronic control unit 16.

Furthermore, said piston 2 is moved in the vertical direction from one to the other of its raised and lowered positions by means of suitable motorised means 19, which preferably comprise an electric motor connected to and controlled by the electronic control unit 16, but which may also comprise hydraulic or pneumatic motors or other suitable motorised means of the traditional type, controlled by said electronic control unit 16. The head 18 of the piston 2 is shaped to be adapted to the chamber 20 of the perforated filter 6, into which a dose of ground coffee is introduced each time, when said piston 2 is moved into the completely lowered position, thus to press the dose of coffee before starting the brewing step.

Advantageously, in the head 18 of the piston 2, at least one elastic gasket 21 is also fixed, wider than said head and adapted to provide a seal against the cup-shaped container 4 in the lowered position of the piston, so that it hermetically seals the chamber 20 during the brewing step of the machine operating cycle.

The coffee bean container 8 of the grinder is realised with a volume such as to contain sufficient coffee beans to prepare various doses of espresso coffee, and beneath its open bottom a grinding unit 22 of the traditional type is applied, actuated by an electric motor 23, connected with the electronic control unit 16 and controlled by the latter at specific intervals, so as to grind the coffee beans for a duration such as to obtain the doses of ground coffee respectively desired. In particular, when the grinding unit 22 is not actuated by the electric motor 23, it prevents free falling of the coffee beans downwards, whereas when said grinding unit 22 is actuated, the coffee beans are ground and channelled downwards by said unit. Beneath the grinding unit 22, a means is applied for channelling the ground coffee downwards, which, in the embodiment, is formed of two metal sheets 24 and 25 folded with each other and having a length such that their lower end is arranged in a position close to the filter-holder element 3, when said element is positioned in the attachment element 7, and with a development such as to prevent possible lateral dispersion of the ground coffee during its channelling towards the chamber 20 of the perforated filter 6.

Obviously, channelling through falling of the ground coffee may also be realised using different means to the metal sheets 24 and 25, without deviating from the scope of protection of the invention.

Figure 2:
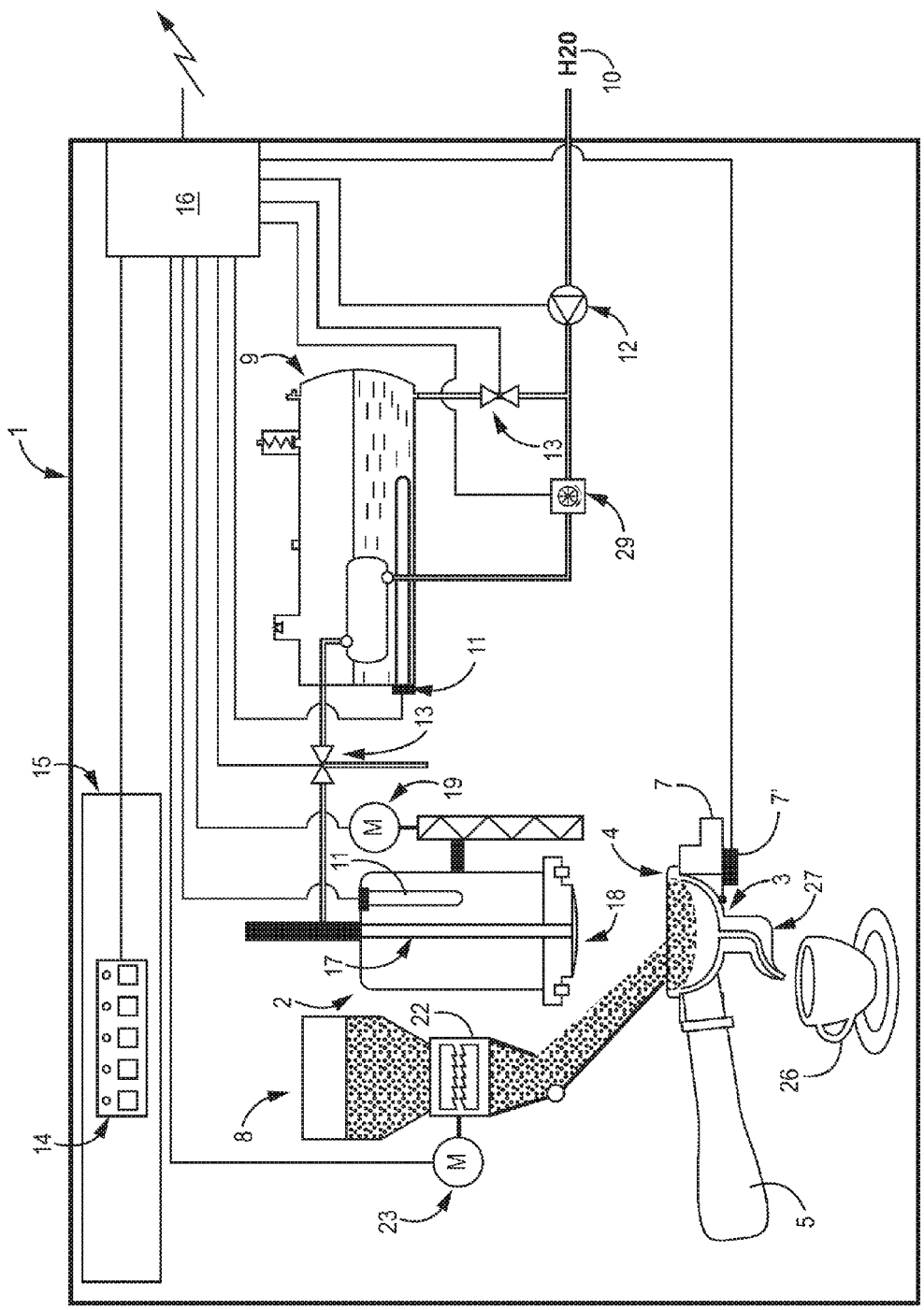
FIGS. 2, 3 and 4 show the coffee maker of FIG. 1, moved into three steps of the operating cycle.
Figure 3:
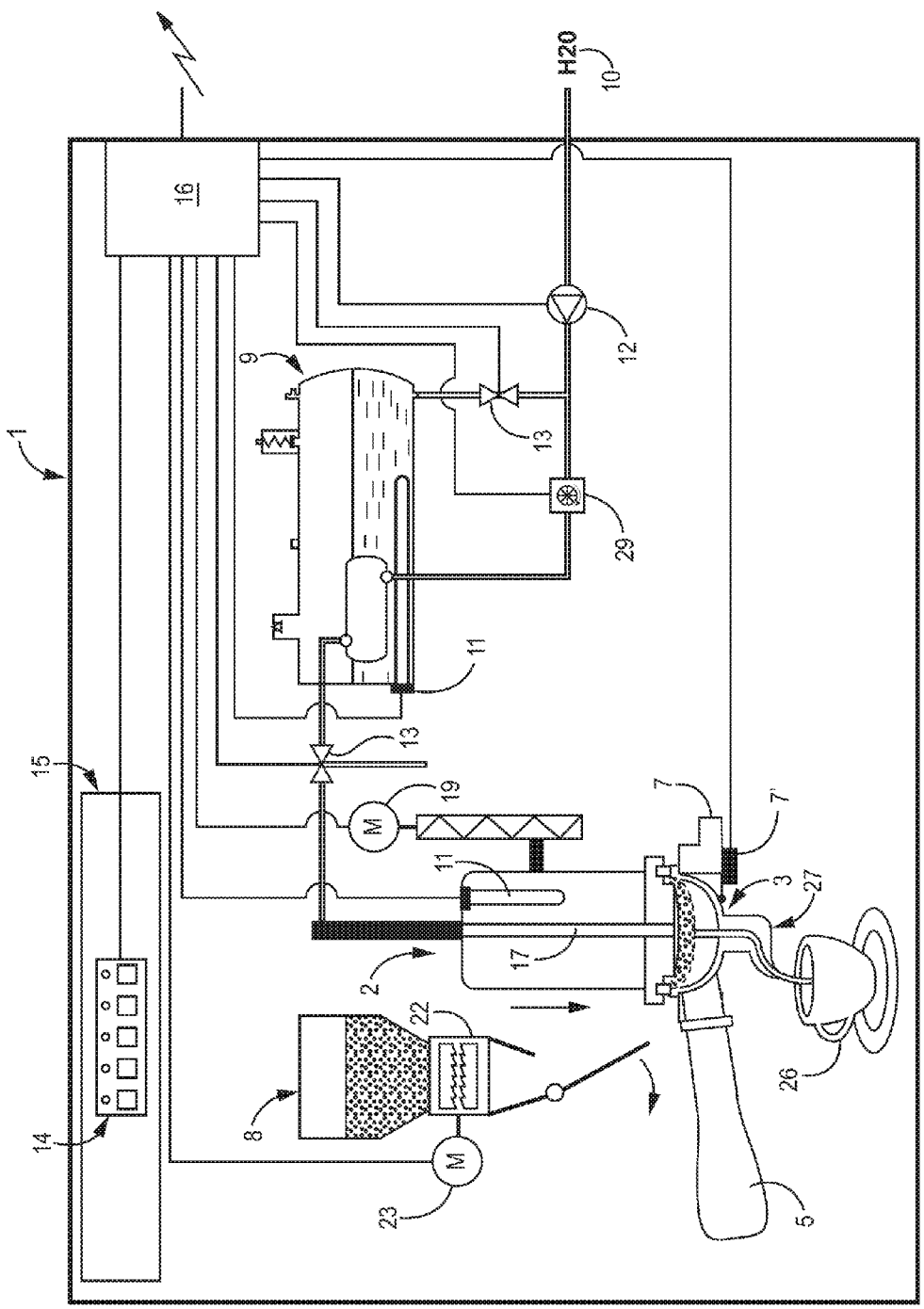
Figure 4:
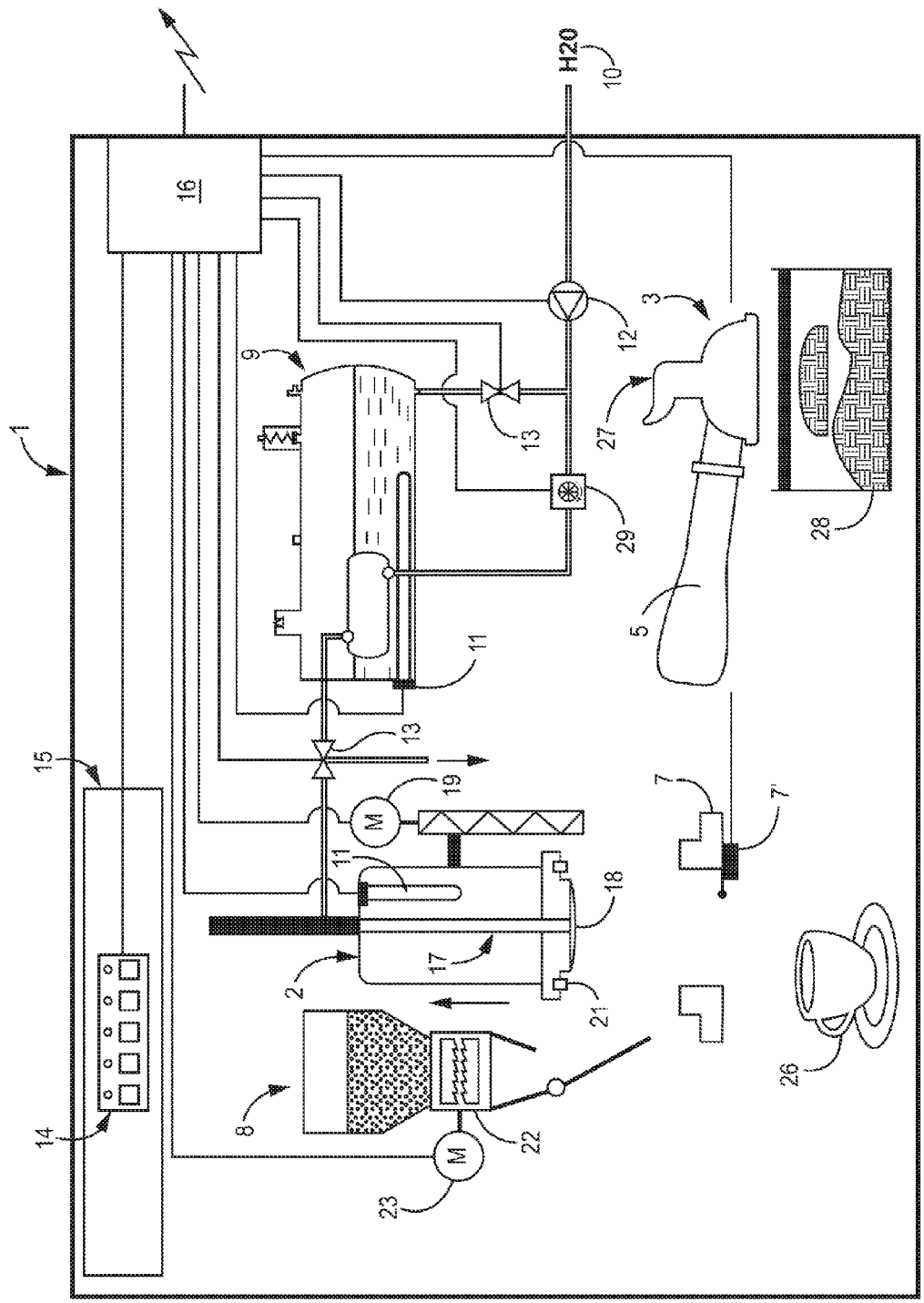

In FIGS. 2-4, the various operating steps to be performed to obtain each espresso coffee are now described. In particular, in the first step illustrated in FIG. 2, it is noted that piston 2 is moved into the raised position and that the filter-holder element 3 is positioned in the attachment element 7 of the machine and remains stationary in this position, wherein the chamber 20 of the perforated filter 6 is located slightly below the lower end of the channelling metal sheets 24 and 25.

The operator then selects beforehand, by means of the respective selector buttons of the series of buttons 14, the quantity and type of coffee to be prepared. The operator then presses the cycle start button and, in this condition, the electronic control unit 16 checks for the presence of the filter-holder element 3, by means of activation of the sensor 7', and causes the motor 23 of the grinder 22 to operate for the entire duration established, with consequent grinding of the coffee beans in a quantity such as to obtain the envisaged dose of ground coffee, which is then channelled into the chamber 20 of the perforated filter 6. Furthermore, in this condition, the control unit 16 maintains switched off both the control motor 19 of the piston 2 and the solenoid valves 13 and the circulation pump 12.

In the second operating phase of FIG. 3, it is noted that, as soon as the control unit 16 detects that the grinding time of the dose of ground coffee selected has passed, it switches off the motor 23 of the grinder 8 and first switches on the motor 19 of the piston 2 and then the solenoid valves 13 and the circulation pump 12. In this condition, the piston 2 is then moved into the lowered position, first moving the metal sheet 25 into the lateral position, spaced from the cup-shaped container 4, and positioning itself with the gasket 21 of its head 18 against the upper edge of said cup-shaped container, with consequent pressing by said head of the dose of ground coffee in the chamber 20, which is hermetically sealed by the gasket 21, and said pressing is performed with a pre-set pressure dependent upon the quality and flavour of the espresso coffee to be obtained. The motor 19 is then switched off and the travel of the piston 2 is stopped, and immediately afterwards the solenoid valve 13 and the circulation pump 12 are activated, with consequent circulation of the hot water from the boiler 9 in succession through the tube 17 and the ground coffee pressed in the chamber 20, thus obtaining the espresso coffee, which is supplied into the cup 26 beneath by means of a spout-shaped tube 27, coupled with the bottom of the perforated filter 6.

When the pre-set dose of espresso coffee has been supplied, the control unit 16 detects said condition, stopping said supply, using traditional volumetric controls 29. In the third operating step of the cycle, illustrated in FIG. 4, the control unit 16 moves all the components of the machine into the initial position of FIG. 1, thus preparing the machine for performance of a subsequent cycle, while the filter-holder element 3 may be removed from the attachment element 7 of the machine, and said filter-holder element is then shaken and struck, causing detachment of the pressed used pod contained in the chamber 20, which is collected in a specific separate container 28, and the cup-shaped container 4 of the filter-holder element 3 is cleaned manually. Lastly, said filter-holder element 3 is once again positioned in the attachment element 7 and is available for lading of a further dose of ground coffee of a subsequent operating cycle.

The espresso coffee maker thus realised allows preparation and supply in succession and continuously of doses of espresso coffee of high quality and flavour, due to the fact of grinding the coffee beans to obtain instant ground coffee powder, maintaining the grinding unvaried for any type and quantity of espresso coffee to be obtained, and allows the cup to be kept satisfactorily clean after each brewing cycle, due to the fact of completely detaching the used pod of the cycle which has just ended from the cup.

Figure 5:
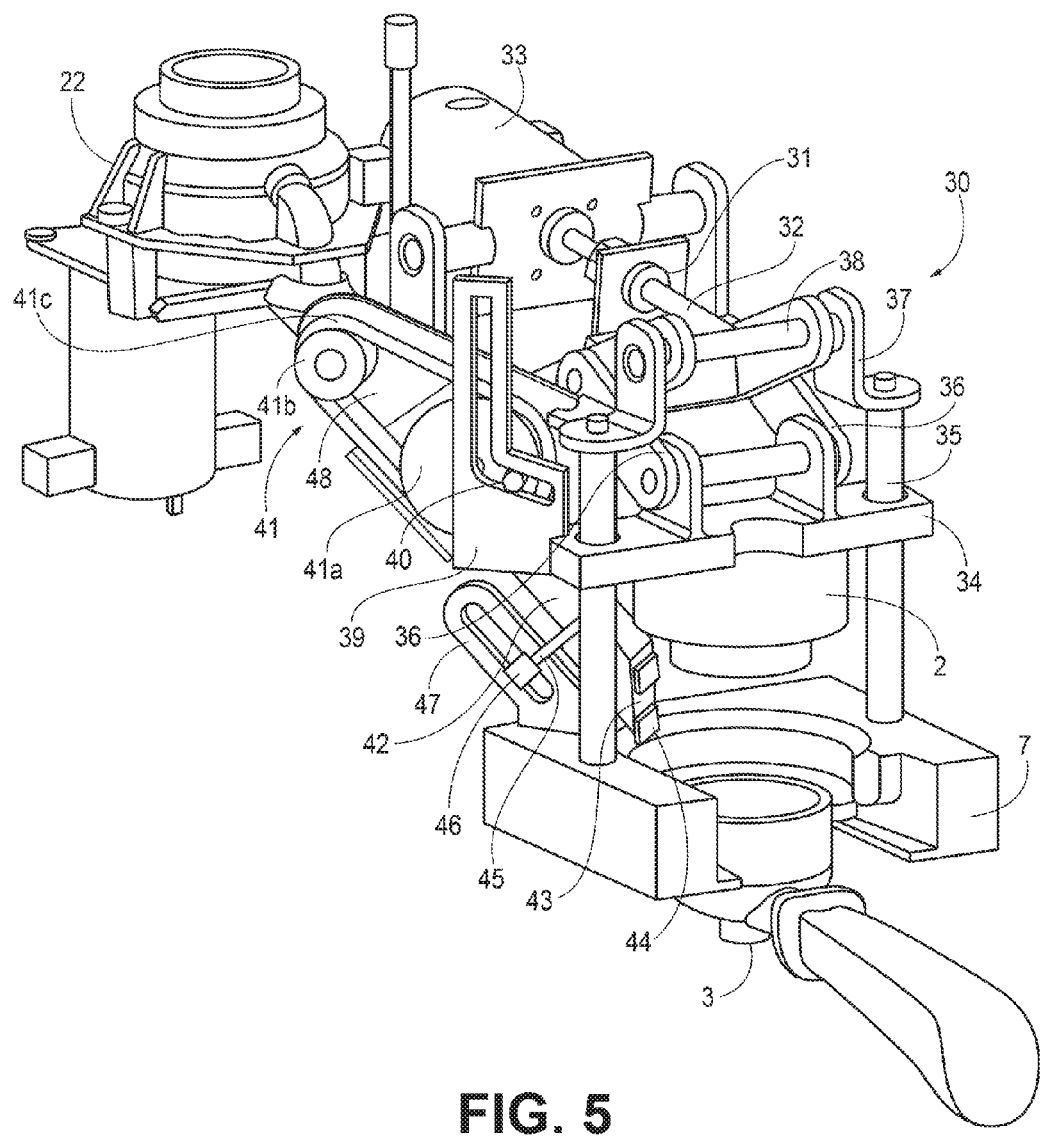
FIGS. 5, 6, 7 and 8 show a schematic view of the mechanical part only of the various components of the super-automatic coffee maker in a preferred embodiment according to the invention, in several successive steps of the operating cycle.

With reference to FIG. 5, in the preferred embodiment, the super-automatic coffee maker according to the invention is shown at the start of the operating cycle and has first motorised means 19 having a mechanical device with toggle mechanisms 30.

In particular, the first motorised means 19 comprise a pusher 31 of the mechanical device with toggle mechanisms 30 capable of moving along a linear guide 32 rigidly connected with the electric motor shaft 33.

The linear guide 32 is formed of an endless screw, actuated by the electric motor 33, with which a screw nut solidly joined with the pusher 31 is engaged: rotation in both directions of the screw causes translation of the screw nut in the two directions along the axis of the guide and therefore of the pusher 31, which in turn is fixed to a crossbar 38 fitted to the two ends to the central hinges of two pairs of two levers 36 of the mechanical device with the toggle mechanisms 30.

These pairs of levers 36 are hinged in turn at one end to a mobile plate 34 to which the piston 2 is fixed and at the other end to a fixed support 37 rigidly connected to the head of two guides 35 along which the plate 34 with the piston 2 travels.

The linear guide 32 may oscillate together with the motor 33 around an axis perpendicular to its own axis so as to allow the pusher 31, in its movement by means of the screw nut along the linear guide 32, to follow the rotating movement of the crossbar 38 with respect to the fixed support 37.

Since support 37 is fixed, advance of the pusher 31 and therefore the crossbar 38 coupled at its two ends to the central hinges of the two pairs of two levers 36 causes translation of the mobile plate 34 guided by two guides 35, and therefore translation of the piston 2 solidly joined with said mobile plate 34; with inversion of the direction of rotation of the linear guide 32, the movement is inverted, the pusher 31 goes backwards and the piston 2 moves in the opposite direction.

The mechanism with toggle mechanisms thus designed allows, with a small movement of the pusher 31, a considerable translation of the plate 34 and therefore of the piston 2, still maintaining the strain to which the electric motor is subjected within extremely limited values, so as to guarantee its longer lifetime and limit wear and tear of the various mechanical components.

At the end of the advanced travel of the pusher 31, the two levers of each single pair of levers 36 are aligned and the strain of the piston 2 is directly transferred to the fixed support 37, removing any axial load from the pusher 31, from the linear guide 32 and from the electric motor 33.

In the preferred embodiment of the super-automatic coffee maker, according to the invention, the channelling means for channelling the ground coffee from the grinding unit 22 comprise a preferably tubular telescopic conveyor 48 with a mobile terminal 42, movement of which is controlled indirectly by said electric motor 33 by means of suitable synchronisation with the mechanisms of the toggle mechanism 30 and by movement of the mobile plate 34 solidly joined with the piston 2.

A slotted device 39 is fixed to the mobile plate 34, comprising a plate, in the slot of which is engaged a cam 40 fixed on a first wheel 41a of a mechanism 41 controlling the mobile terminal 42 of the telescopic conveyor 48.

Translation of the plate 34 solidly joined with the piston 2 and the suitable shape of the slot leads to controlled rotation of the first wheel 41 a of the mechanism 41 which is attached with a mechanical device and in particular with a belt 41 c to a second gearing down wheel 41 b; said belt 41 c is connected in turn to the mobile terminal 42 and its rotation around a pair of wheels 41 a and 41 b of the mechanism 41 causes linear movement of the mobile terminal 42 along the telescopic conveyor 48.

The belt 41 c may possibly be replaced with a rack device.

Furthermore, according to the invention, the mobile terminal 42 of the telescopic conveyor 48 comprises at one end of a door 43 which, by means of its own rotation in opening and closure, controls the fall of the ground coffee into the filter-holder element 3; movement of the door 43 is implemented through translation of the mobile terminal 42 and in synchrony with the other operating steps of the super-automatic machine.

The door 43 is, in fact, hinged at one end to the mouth of the mobile terminal 42 and has an extension element 44 beyond said hinge; connected to said extension element there is a duly configured lever 45 centrally attached with a hinge to the mobile terminal 42; at the other end, said lever 45 is engaged by means of a cam 46 to a slot of a slotted element 47 rigidly connected with the attachment element 7.

Translation of the mobile terminal 42 drags the cam 46 into the slot of the element 47 until the geometry of the slot causes, by means of the cam 46, rotation of the lever 45 around its central hinge and therefore rotation of the other end connected to the extension element 44 of the door 43, which, as a result, opens or closes.

Substantially, according to the present invention, the action of the sole initial motorised means 19 of movement of the piston 2 causes, as indicated above, through appropriate mechanical means of synchronisation, movement of the mobile terminal 42 of the telescopic conveyor 48 of the ground coffee blend and also coordinated opening and closure of the door 43 of said mobile terminal 42 at the filter-holder element 3.

Figure 6:
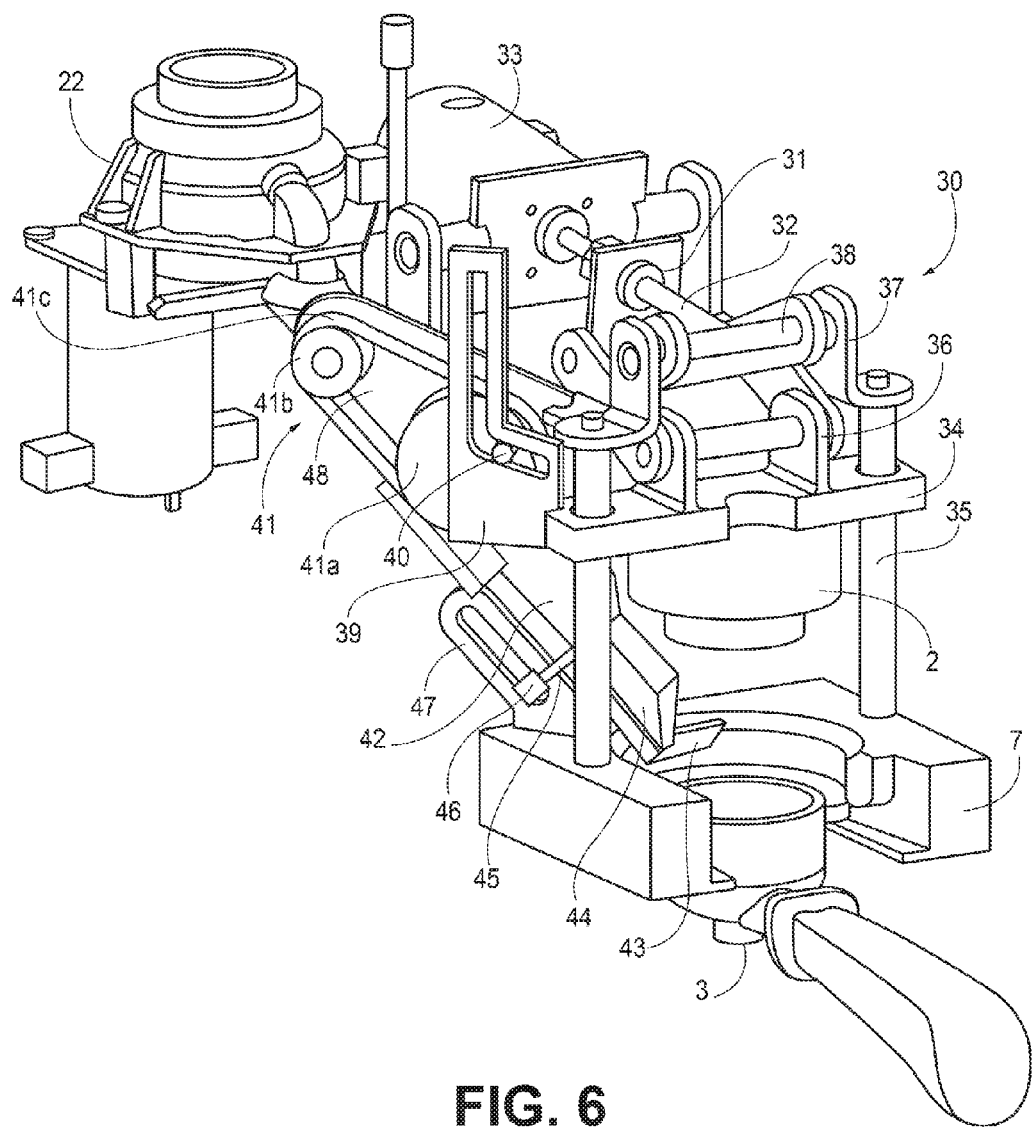
Figure 7:
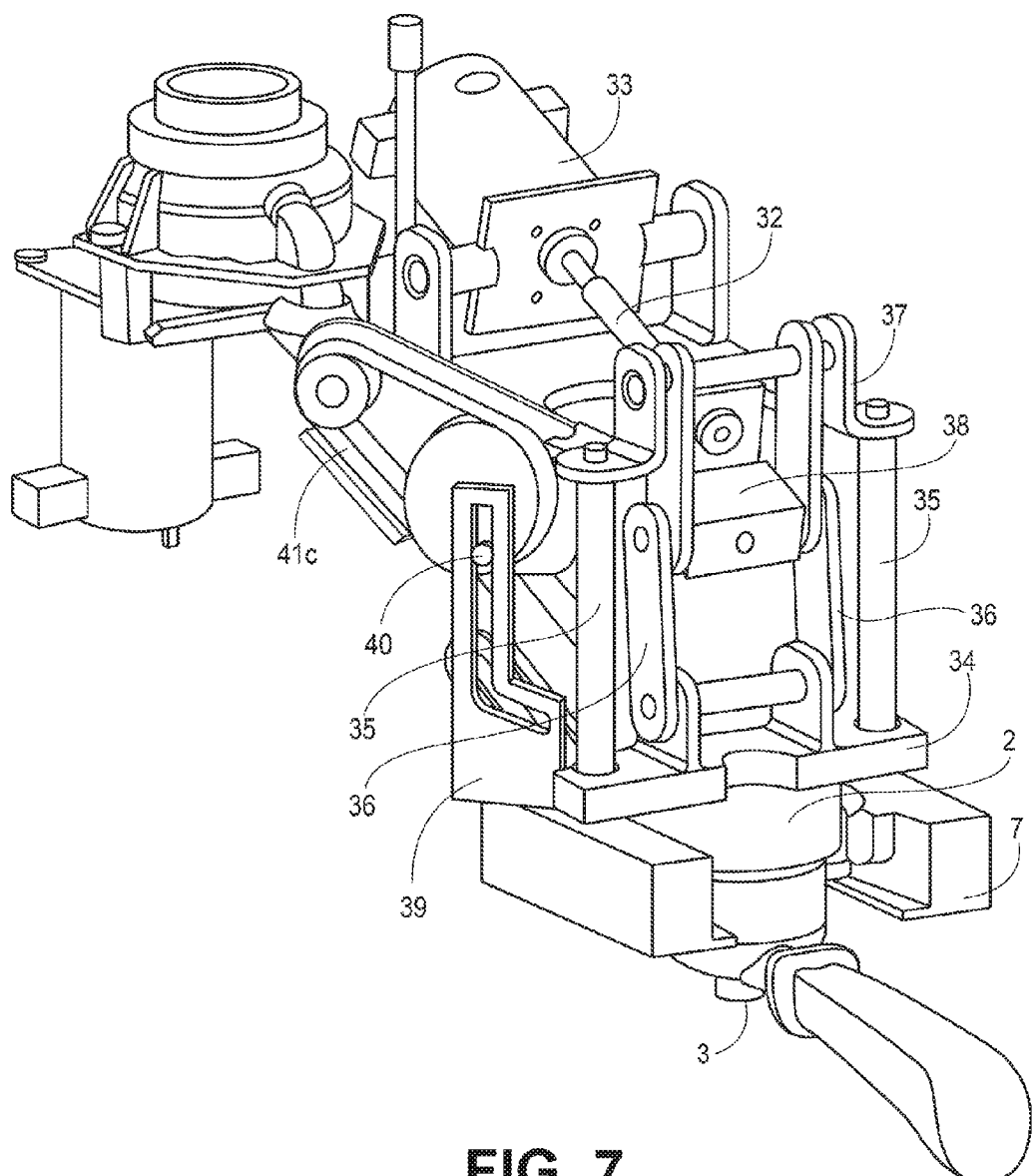
Figure 8:
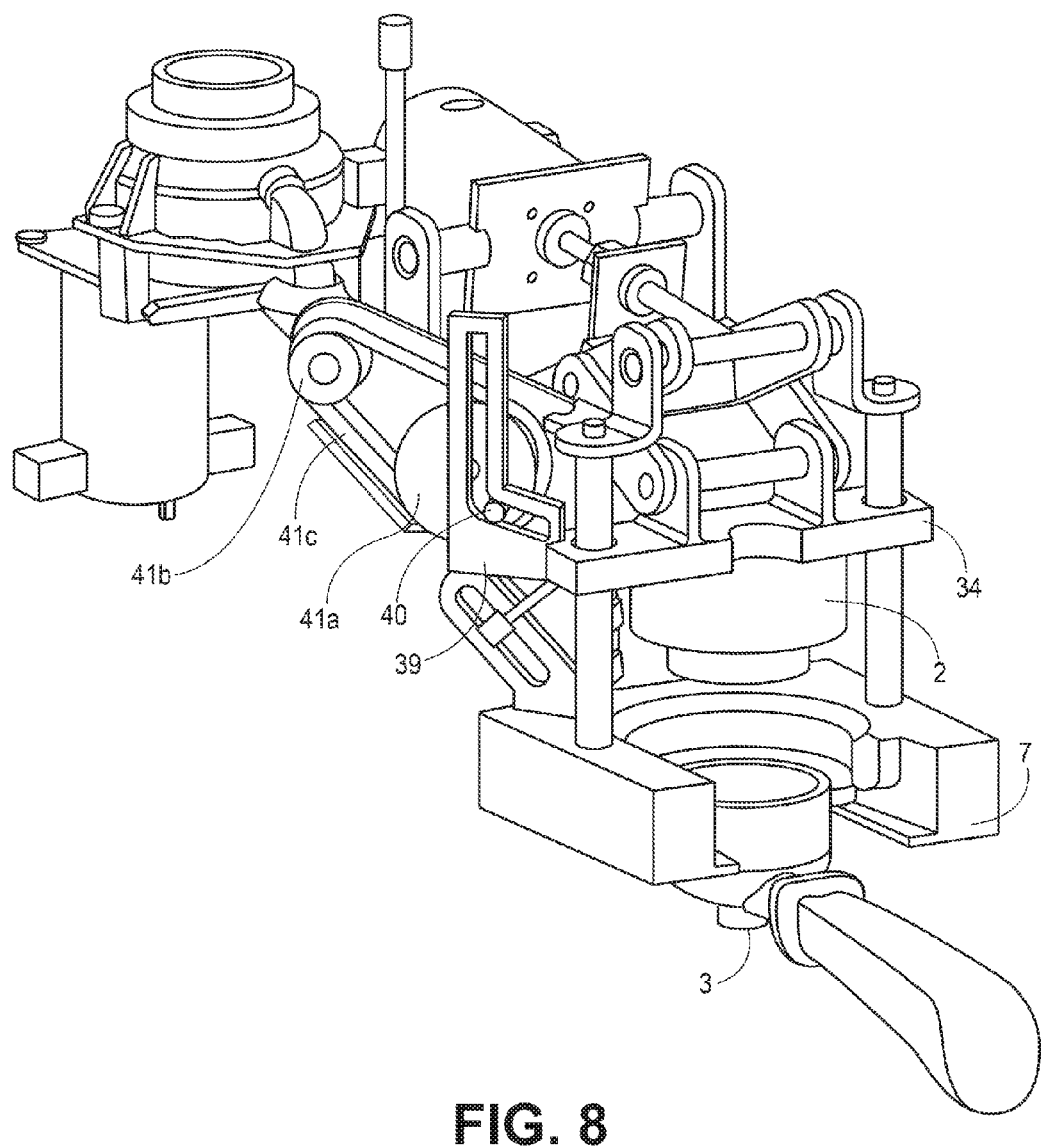

FIGS. 6, 7 and 8 show other operating steps of the super-automatic machine: in particular, FIG. 6 shows the loading step of the ground coffee blend into the filter-holder element 3; FIG. 7 shows the position of the mechanical elements in the final step of pressing by the piston 2 of the coffee blend in the filter-holder element 3 and in the subsequent brewing step; FIG. 8 shows the mechanical elements at the end of the cycle returned to the initial position, with the filter-holder element 3 free to be removed, cleaned and then once again repositioned in the attachment element 7 for a new subsequent production cycle.

Modifications and variations in addition to those described are naturally possible, particularly those relating to materials, dimensions and proportions of the elements shown in the figures.

The super-automatic machine for preparation of espresso coffee as conceived herein is susceptible to modifications and variations, all falling within the scope of the inventive concept; furthermore, all the details are replaceable by technically equivalent elements.

The materials used, as well as the dimensions, may in practice be of any type according to requirements and the state of the art.

The invention claimed is:

1. A automatic coffee maker for the preparation of espresso coffee, the coffee maker comprising:
   an external box-shaped cupboard enclosing at least one elongated vertical piston, controllable by a first motor, operable from a raised position to a lowered position and vice versa;
   at least one boiler supplied by a water main and provided with thermostatted heating elements to prepare water and steam heated to pre-set temperatures;
   at least one coffee container, for containing coffee beans to be ground, associated with a grinding device of the coffee beans, actuated by a second motor, to prepare doses of ground coffee to be channeled downwardly by a channeling device;
   a pump and valves, connected with the boiler and the water main;
   a selector of coffee maker operating cycles, included in a control panel of the coffee maker; and
   an electronic controller connected operatively with the heating elements, the pump, the valves, the selector and the first and the second motors, so that, depending on operating cycles respectively chosen, the controller controls performance of the operating cycles and a collection and brewing of each single dose of ground coffee;
   where a collection and brewing collector is removably located in a lower part of the coffee maker during a brewing step and removable from the lower part of the coffee maker at an end of each brewing step, the collection and brewing collector arranged in a position underlying the at least one elongated vertical piston, and in a position under the channeling device, so to receive the ground coffee channeled downwardly and to supply espresso coffee produced during brewing into a serving container beneath;
   wherein the at least one elongated vertical piston includes at least one tube for circulation of hot water coupled with the boiler, via the valves, the at least one piston shaped to adapt a lower head thereof with the collection and brewing collector;
   the at least one elongated vertical piston being controllable during each operating cycle in a raised position thereof, away from the collection and brewing collector, to allow introduction into the collection and brewing collector of ground coffee, where, while the at least one piston is in a raised position, the valves are closed and hot water does not circulate through the at least one tube; and
   the at least one elongated vertical piston being controllable in a lowered position to press the lower head thereof the ground coffee, pressing with a pre-set pressure dependent upon a quality and flavor of espresso coffee selected, and, after the pressing by the at least one elongated vertical piston, hot water passes through the tube of the at least one elongated vertical piston, causing passage of the hot water through ground coffee introduced into the collection and brewing collector, and a consequent supply of espresso coffee into the serving container, the collection and brewing collector being finally first removed from the lower part of the coffee maker to detach a used pod therefrom and clean manually, the collection and brewing collector once again applied in the lower part of the coffee maker, in a condition wherein the at least one elongated vertical piston is once again moved to a raised position and wherein the valves and the pump are switched off to prepare the coffee maker for a subsequent operating cycle;

wherein the collection and brewing collector includes a filter-holder element, formed of a cup-shaped container, the filter-holder element forming an integral unit with by an elongated handle for gripping by a user, and provided with a perforated filter to contain a dose of ground coffee, the integral unit of the filter-holder element and elongated handle being positionable and removable with respect to an attachment element fixed to the coffee maker, so that, in an operating position of the filter-holder element, the cup-shaped container is in a position underlying, and coinciding with, the lower head of the at least one piston, for adaption thereof in a chamber of the perforated filter, with interposition of a gasket fixed with the lower head to the at least one elongated vertical piston, the gasket serving to hermetically seal the chamber of the perforated filter during brewing;

where the filter-holder element is removable from the coffee maker and includes a bottom thereof with a small spout-shaped tube for supply of the espresso coffee prepared.

2. The coffee maker of claim 1, further comprising at least one piston disposed on the coffee maker in a horizontal or variously inclined position.

3. The coffee maker of claim 1, wherein the first motor comprises a mechanical device with toggle mechanisms.

4. The coffee maker of claim 3, wherein the first motor further comprises an electric motor and a pusher of the mechanical device with toggle mechanisms which translate along a linear guide rigidly connected with a shaft of the electric motor and which oscillate therewith around an axis perpendicular to an axis of the linear guide.

5. The coffee maker of claim 4, wherein the linear guide is formed of an endless screw controlled by the electric motor, with which a screw nut solidly joined with the pusher is rotatably engaged.

6. The coffee maker of claim 3, wherein the mechanical device with toggle mechanisms comprises two pairs of two levers reciprocally hinged by means of central hinges and hinged at one end to a mobile plate and at a other end to a support rigidly connected to a head of two guides along which the mobile plate slides.

7. The coffee maker of claim 4, wherein the pusher is fixed to a crossbar coupled at two ends to central hinges of two pairs of two levers of the mechanical device with toggle mechanisms.

8. The coffee maker of claim 1, wherein the channeling device includes a telescopic conveyor with a mobile terminal controllable by a respective motor.

9. The coffee maker of claim 8, further comprising synchronization of movement of the mobile terminal of the telescopic conveyor and the at least one elongated vertical piston.

10. The coffee maker of claim 9, wherein synchronization is provided by a slotted device controlling a cam which moves a toggle operating the mobile terminal of the telescopic conveyor, fixed to a mobile plate, in turn solidly joined in movement with the at least one elongated vertical piston.

11. The coffee maker of claim 10, wherein the toggle comprises a pair of wheels connected by a mechanism which causes telescopic translation of the mobile terminal of the telescopic conveyor.

12. The coffee maker of claim 8, wherein the mobile terminal of the telescopic conveyor comprises a door at one end.

13. The coffee maker of claim 12, wherein the mobile terminal of the telescopic conveyor includes transformation of translation thereof into opening and closing rotation of the door.

14. The coffee maker of claim 12, further comprising a lever for opening and closing the door, the lever being centrally attached with a hinge to the mobile terminal and at one end attached by means of a cam to a slot of a slotted element rigidly connected with the attachment element, and at a other end to an extension element of the door, in turn hinged to the mobile terminal.

* * * * *